Patented July 4, 1950

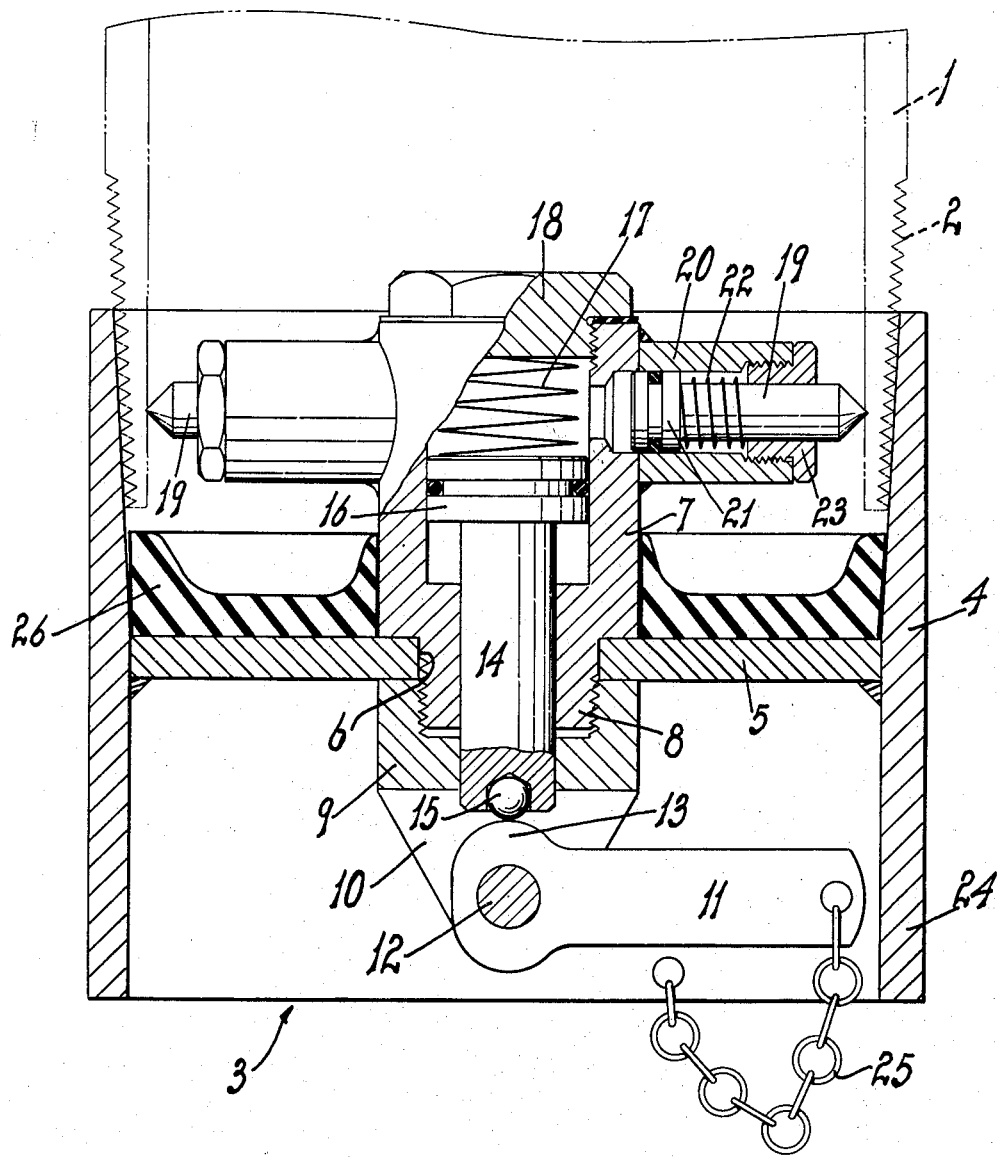

2,513,613

UNITED STATES PATENT OFFICE 2,513,613

HYDRAULICALLY ACTUATED PIPE THREAD PROTECTOR

Willis C. Baker, Long Beach, Calif.

Application November 24, 1947, Serial No. 787,736

8 Claims. (Cl. 138—96)

This invention relates to a hydraulically actuated pipe thread protector, whereby the threads of a stand of pipe are covered and protected while the pipe is being moved from one place to another, such as in the drilling or production of an oil well where the pipe is moved from the rack to the bore of the well.

An object of my invention is to provide a novel hydraulically actuated pipe thread protector wherein pipe engaging pins are pressed outwardly into engagement with the pipe by the pressure of a hydraulic cylinder.

Another object of my invention is to provide a novel hydraulically actuated pipe thread protector of the character stated, in which the hydraulic piston is manually operated to extend and retract the pipe engaging pins.

A feature of my invention is to provide a device of the character stated, which is simple in construction, and which can be quickly and easily placed on the pipe or removed therefrom, and which will effectively remain in position under the stresses of moving the pipe about from one place to another.

Another feature of my invention is to provide a device of the character stated which can be used both as a thread protector and as a pipe plug when desired.

Other objects, advantages, and features of invention may appear from the accompanying drawing, the subjoined detailed description and the appended claims.

In the drawing:

The figure in the drawing is a transverse sectional view of my hydraulically actuated pipe thread protector.

Referring more particularly to the drawing, the stand of pipe 1, is provided with external threads 2, and it is these threads which are protected and prevented from being battered while the pipe is being moved from place to place.

My thread protector 3, consists of a sleeve 4, which fits over the end of the pipe 1. The sleeve 4, has a transverse wall 5, therein, and this wall is formed with a central hole 6. To hold the sleeve 4, securely in position, on the pipe, the following structure is mounted within the sleeve: a hydraulic cylinder 7, shoulders against the wall 5, and the threaded end 8, of the cylinder extends through the hole 6. A nut 9, screws onto the threaded end of the cylinder 7, and also bears against the wall 5, thus securely holding the cylinder assembly in position. A pair of ears 10, project from the nut 9, and a cam lever 11, is journaled between the ears 10, on the pin 12. The pin is mounted in the ears 10, and the cam lever 11, is free to swing through approximately 180°. The lever 11, is provided with cams 13, which engage the piston rod 14, substantially as shown.

The piston rod 14, projects through the lower end of the cylinder 7, and through the nut 9. A ball bearing 15, in the end of the piston rod 14, is engaged by the cam 13, and this ball reduces the function between the cam and the piston rod 14. The piston rod 14, projects from a piston 16, which is reciprocally mounted in the cylinder 7. The piston 16, and the rod 14, are urged to a retracted position by the spring 17, which is within the cylinder 7, and bears against the upper face of the piston 16, and against a closure cap 18.

The pipe engaging pins 19, are each mounted in a barrel 20, which project horizontally from the cylinder 7. These pins are each provided with suitably sharpened ends to engage the inner surface of the pipe 1, and thus holding the entire thread protector assembly in position. The pins 19, are each provided with a piston head 21, and a spring 22, bearing against this head urges the pins to retracted position.

A nut 23, may be threaded into the end of the barrel to act as a closure.

In operation the cam lever 11, is moved so that the cams 13, are not engaging the end of the piston rod 14. The piston 16, is then retracted within the cylinder 7, and the pins 19, are also retracted. The sleeve, 4, is now slipped over the threads of the pipe 1, and then the lever 11, is swung into the position shown in the drawing. This moves the cylinder 16, and the hydraulic fluid within the cylinder 7, will actuate the pins 19, pressing them outwardly into engagement with the pipe as shown in the drawing. The sleeve 4, may be provided with a skirt 24, which serves to protect the lever 11, while the pipe is being moved.

Also a chain, 25, may be attached to the lever 11, thus enabling the operator to grasp this chain when the lever is to be swung to release the pipe engaging pins 19.

If my protector should be used as a plug to seal the end of a pipe stand, I may provide a packing ring 26, which is mounted within the sleeve 4, and rests on the wall 5, substantially as shown.

Having described my invention, I claim:

1. A hydraulically actuated pipe thread protector comprising a sleeve, pipe engaging pins, means mounting said pins within the sleeve, and hydraulic means mounted in the sleeve and operable to extend said pins into engagement with the pipe, and manually operable means to actuate said hydraulic means.

2. A hydraulically actuated pipe thread protector comprising a sleeve, a cylinder mounted within the sleeve, a hydraulic piston in the cylinder, means to actuate said piston, and pipe engaging pins projecting from said cylinder, and operable by said piston.

3. A hydraulically actuated pipe thread protector comprising a sleeve, a hydraulic cylinder mounted in the sleeve, a piston in said cylinder, manual means engaging said piston to actuate the same, pipe engaging pins projecting from the cylinder, said pins being actuated by said piston.

4. A hydraulically actuated pipe thread protector comprising a sleeve, a transverse wall in the sleeve, a cylinder mounted on said wall, a piston in said cylinder, manual means to operate said piston, and pipe engaging pins projecting from the cylinder and operable by said piston.

5. A hydraulically actuated pipe thread protector comprising a sleeve, a transverse wall in the sleeve, a cylinder mounted on said wall, a piston in said cylinder, a piston rod projecting from the piston and out of said cylinder, manual means engageable with the piston rod to actuate said piston, and pipe engaging pins projecting from the cylinder and operable by said piston.

6. A hydraulically actuated pipe thread protector comprising a sleeve, a transverse wall in said sleeve, a cylinder mounted on said wall, a piston in said cylinder, a piston rod projecting from the cylinder, a cam lever journaled adjacent said piston rod and engaging the end of said piston rod, and pipe engaging pins projecting from the cylinder and operable by said piston.

7. A hydraulically actuated pipe thread protector comprising a sleeve, a transverse wall in the sleeve, a cylinder mounted on said wall, a piston in said cylinder, manual means to operate said piston, and pipe engaging pins projecting from the cylinder and operable by said piston, and a packing cup within the sleeve and surrounding said cylinder, said packing cup resting on said transverse wall.

8. A hydraulically actuated pipe thread protector comprising a sleeve, a transverse wall in said sleeve, a cylinder mounted on said wall, a piston in said cylinder, a piston rod projecting from the cylinder, a cam lever journaled adjacent said piston rod and engaging the end of said piston rod, and pipe engaging pins projecting from the cylinder and operable by said piston, and a packing cup within the sleeve and surrounding said cylinder, said packing cup resting on said transverse wall.

WILLIS C. BAKER.

REFERENCES CITED

The following references are of record in the file of this patent:

UNITED STATES PATENTS

| Number | Name | Date |
|---|---|---|
| 912,502 | Squires | Feb. 16, 1909 |
| 1,196,454 | Kahn et al. | Apr. 9, 1940 |